(12) United States Patent
Napier et al.

(10) Patent No.: US 7,747,998 B2
(45) Date of Patent: Jun. 29, 2010

(54) ELEVATED PATCHING

(75) Inventors: Carolyn L. Napier, Seattle, WA (US); Christopher S. Gouge, Redmond, WA (US); David E. Kays, Bellevue, WA (US); Rahul Thombre, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 10/930,718

(22) Filed: Aug. 31, 2004

(65) Prior Publication Data

US 2006/0048131 A1    Mar. 2, 2006

(51) Int. Cl.
*G06F 9/44* (2006.01)

(52) U.S. Cl. .................. 717/172; 717/169; 717/170; 717/175

(58) Field of Classification Search .......... 717/168–178
See application file for complete search history.

(56) References Cited

U.S. PATENT DOCUMENTS

| | | | |
|---|---|---|---|
| 5,649,200 A | 7/1997 | Leblang et al. |
| 6,161,218 A | 12/2000 | Taylor |
| 6,317,880 B1 | 11/2001 | Chamberlain et al. |
| 6,381,742 B2 | 4/2002 | Forbes et al. |
| 6,427,236 B1 | 7/2002 | Chamberlain et al. |
| 6,434,744 B1 | 8/2002 | Chamberlain et al. |
| 6,438,749 B1 | 8/2002 | Chamberlain |
| 6,477,703 B1 | 11/2002 | Smith et al. |
| 6,493,871 B1 | 12/2002 | McGuire et al. |
| 6,496,974 B1 | 12/2002 | Sliger et al. |
| 6,668,289 B2 | 12/2003 | Cheng et al. |
| 6,772,192 B1 | 8/2004 | Fulton et al. |
| 6,859,923 B2 | 2/2005 | Taylor |
| 7,073,172 B2 | 7/2006 | Chamberlain |
| 7,185,332 B1 | 2/2007 | Waldin et al. |
| 7,313,792 B2 | 12/2007 | Buban et al. |
| 2001/0027554 A1 | 10/2001 | Imachi et al. |
| 2001/0029605 A1 | 10/2001 | Forbes |
| 2002/0100036 A1 | 7/2002 | Moshir et al. |
| 2002/0104069 A1 | 8/2002 | Gouge et al. |
| 2002/0144248 A1 | 10/2002 | Forbes et al. |
| 2002/0152229 A1 | 10/2002 | Peng |
| 2002/0174422 A1 | 11/2002 | Kelley et al. |

(Continued)

FOREIGN PATENT DOCUMENTS

CA    2299850 A1    9/2001

(Continued)

OTHER PUBLICATIONS

Povos, "Improving Host Security with System Call Policies", CiteSeer, CITI—University of Michigan, pp. 1-15, Nov. 2002.*

(Continued)

*Primary Examiner*—Ted T Vo
(74) *Attorney, Agent, or Firm*—Senniger Powers LLP

(57) ABSTRACT

Allowing a non-privileged user to apply a patch to a software product. A patch is received from a non-privileged user. It is determined if the received patch may be elevated by the non-privileged user for applying to a target software product. The received patch is applied to the target software product if it is determined that the received patch may be elevated by the non-privileged user for applying to the target software product.

12 Claims, 6 Drawing Sheets

U.S. PATENT DOCUMENTS

| | | |
|---|---|---|
| 2003/0056102 A1 | 3/2003 | Aho et al. |
| 2003/0145317 A1* | 7/2003 | Chamberlain ............... 717/177 |
| 2003/0182652 A1 | 9/2003 | Custodio |
| 2003/0220944 A1 | 11/2003 | Lyman Schottland et al. |
| 2003/0220992 A1 | 11/2003 | DiRico |
| 2004/0003266 A1 | 1/2004 | Moshir et al. |
| 2004/0003390 A1 | 1/2004 | Canter et al. |
| 2004/0015857 A1 | 1/2004 | Cornelius et al. |
| 2004/0088694 A1 | 5/2004 | Ho |
| 2004/0181790 A1 | 9/2004 | Herrick |
| 2004/0210653 A1 | 10/2004 | Kanoor et al. |
| 2004/0215755 A1 | 10/2004 | O'Neill |
| 2005/0050538 A1 | 3/2005 | Kawamata et al. |
| 2005/0155031 A1 | 7/2005 | Wang et al. |
| 2005/0257214 A1 | 11/2005 | Moshir et al. |
| 2006/0020938 A1 | 1/2006 | Elcock et al. |
| 2007/0079279 A1 | 4/2007 | Gordon et al. |

FOREIGN PATENT DOCUMENTS

| | | |
|---|---|---|
| WO | 0077614 A | 12/2000 |

OTHER PUBLICATIONS

Povos et al., "Preventing Privilege Escalation", CiteSeer, CITI—University of Michigan, pp. 1-11, Aug. 2002.*

Borup, Rick, "Understanding Windows Installer," Oct. 2003, 16 pages.

Microsoft, "Windows Installer: Benefits and Implementation for System Administration," Nov. 1, 2001, 73 pages, available at http://www.microsoft.com/technet/prodtechnol/windows2000serv/maintain/featusability/w..., printed on Aug. 25, 2007.

* cited by examiner

ELEVATED PATCHING

BACKGROUND

Embodiments of the present invention relate to the field of software updates. In particular, embodiments of the invention relate to allowing a less privileged user to apply a patch to a software product.

With the ever-increasing frequency of software product updates and the continually improving ease of patch distributions and applications, administrators increasingly find it difficult to keep a software product up-to-date with the large number of updates that are available. Unfortunately, existing patching techniques do not allow an administrator to apply multiple patches at the same time with unified progress and rollback in a single transaction. The updates may have any of the following properties: a series of updates for a single product, a single update that applies to multiple products, multiple updates that apply to different products, or a combination of the above. Under existing patching techniques, an administrator may chain together a series of updates for a single product. However, the existing patching techniques apply the updates one by one in multiple transactions—a time intensive operation. Additionally, an administrator may use the existing patching techniques to apply an update to multiple products installed on a machine. Each target product is patched in a separate transaction. Thus, a failure in the transaction will rollback the patching of the current target product and will terminate the process to update multiple products, which may leave one or more products un-patched. And the target products that were patched before the failure will remain updated. Accordingly, under the existing patching techniques, administrators may not effectively update multiple target products without losing productivity and do not have the ability to deliver a new application to an existing machine or an existing application to a new machine without managing multiple patching or installation transactions. Furthermore, if the original product has a security vulnerability, then the current patching techniques may leave the product in the vulnerable state until the different patches have been applied to the product.

Additionally, with the volume of available product updates, administrators find it increasingly difficult to manage the security of the machines in their environments. Even though administrators typically do not want their users to have administrative privileges, some product updates desire users to have administrative privileges to apply the updates. In addition, even though administrators may allow a non-privileged user to patch a software product by enabling a system-wide policy that permits patching of different software products on a system, security implications may prohibit the administrators from enabling this system-wide policy. More specifically, under current patching techniques, if a software product is installed with elevated privileges, then a non-privileged user may not be able to update the software product unless an administrator enables the system-wide policy. This system-wide policy equally applies to different user accounts and different patches and does not allow an administrator to individually enable a particular user account or a particular patch to update a software product. Thus, the current patching techniques do not allow a user to effectively apply a pre-approved patch to a software product without having the administrative privilege.

Further complicating the problem, products that desire administrative privileges for installation typically install files in locations to which non-administrative users do not have write access. This limitation does not function well in a home user environment or in a corporate environment. For example, in a home user environment, a software product may desire that a user to have the ability to run the product as a non-administrator. However, the software product that desires patches to run properly may update files in a location in which a non-administrator generally does not have write privileges. This is especially true for massive multi-user online games where users patch the games on their systems to match the version installed on a server. In a corporate environment, the existing patching techniques typically do not allow an administrator to grant a non-privileged user the privilege to install an update. Thus, the administrator may have to apply the update such that the update is included in the original installation. The client machine would then have to be re-synchronized with the patched image to obtain the update. Thus, current patching techniques do not provide an effective way for non-privileged clients to patch a software product without compromising system security.

Accordingly, a solution that effectively applies multiple patches to one or more software products in a single transaction and allows a non-privileged user to apply a patch to a software product is desired.

SUMMARY OF THE INVENTION

Embodiments of the invention overcome one or more deficiencies in the prior art by providing, among other things, application of multiple patches in a single transaction to a single target software product or to multiple target software products. One embodiment of the invention allows an administrator to install multiple updates for a software product at the same time within the same transaction. Another embodiment of the invention allows the administrator to simultaneously install a software product and available updates such that the software product is up-to-date from the onset. Thus, the embodiment of the invention allows the software product to be installed in a secure, non-vulnerable state. The administrator may further update different software products on a given machine with different updates at the same time.

Embodiments of the invention also allow application of product updates by a non-privileged user (e.g., a non-administrator) when an administrator approves the update installation. Thus, in situations where privilege to install a particular patch is desired (e.g., when a software product desires a privileged user to apply the patch or where the software product is installed to a location that the non-privileged user does not have the rights to modify), an administrator may pre-approve the installation of the patch by a non-privileged user. In addition, an embodiment of the invention allows a software product that desires approved patches in order to run, such as a massive multi-user online game, to be capable of self-update. This capability allows users to run such a software product as non-administrators even if the patches update the software product in a location where the users generally do not have write privileges.

Briefly described, a method employing aspects of the invention allows a non-privileged user to apply a patch to a software product. The method includes receiving a patch from a non-privileged user. The method also includes determining if the received patch may be elevated by the non-privileged user for applying to a target software product. The method further includes applying the received patch to the target software product if it is determined that the received patch may be elevated by the non-privileged user for applying to the target software product.

In another embodiment of the invention, a system employing aspects of the invention allows a non-privileged user to apply a patch to a software product. The system includes a processor configured to receive a patch from a non-privileged user. The processor is also configured to determine if the received patch may be elevated by the non-privileged user for applying to a target software product. The processor is configured to apply the received patch to the target software product if it is determined that the received patch may be elevated by the non-privileged user for applying to the target software product.

In yet another embodiment of the invention, computer-readable media have computer-executable components for allowing a non-privileged user to apply a patch to a software product. The computer-readable media include a sequencing component for receiving a patch from a non-privileged user. The computer-readable media also include a trust evaluator component for determining if the received patch may be elevated by the non-privileged user for applying to a target software product. The computer-readable media further include an application component for applying the received patch to the target software product if it is determined that the received patch may be elevated by the non-privileged user for applying to the target software product.

In yet another embodiment of the invention, computer-readable media have stored thereon a data structure for allowing a non-privileged user to apply a patch to a software product. The data structure includes a patch certificate field for storing data identifying a patch that is digitally signed by a certificate. The data structure also includes a digital certificate field for storing data pointing to the certificate of the identified patch.

Computer-readable media having computer-executable instructions for performing a method of allowing a non-privileged user to apply a patch to a software product embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
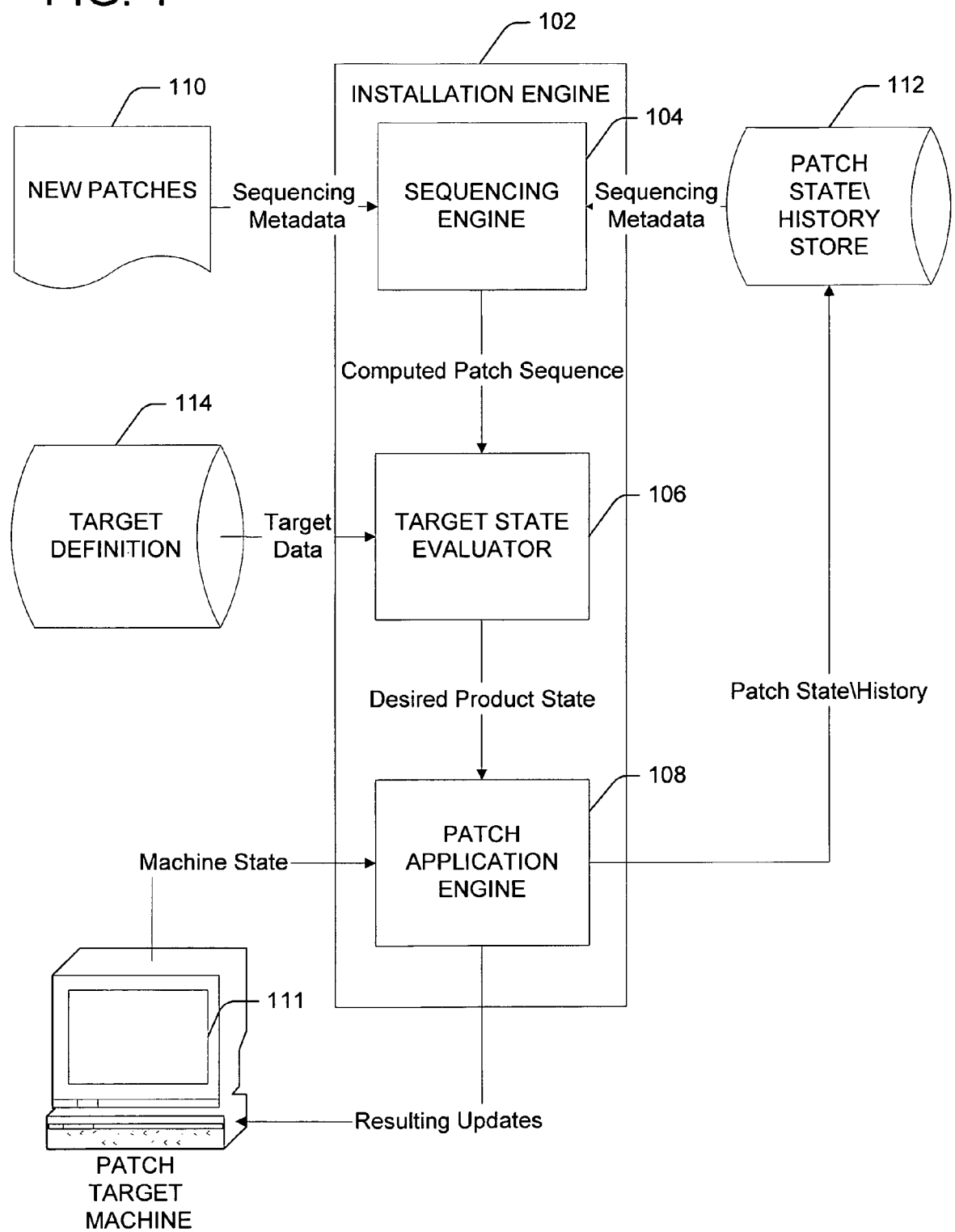
FIG. 1 is a block diagram illustrating an exemplary environment in which embodiments of the present invention may be utilized.

FIG. 1 illustrates an exemplary environment in which embodiments of the invention may be utilized. As shown in FIG. 1, a processor such as an installation engine 102 includes a sequencing engine 104, a target state evaluator 106, and a patch application engine 108. In FIG. 1, the installation engine 102 is attempting to apply a set of new patches 110 to one or more software products installed on a patch target machine 111. Alternatively, installation engine 102 may attempt to simultaneously install the set of new patches 110 and one or more software products that patches 110 are applicable to the patch target machine 111. The set of new patches 110 represents one or more updates to one or more software products. As illustrated, the sequencing engine 104 of installation engine 102 receives the set of new patches 110. Included in this set of new patches 110 is sequencing data that describes the order in which patches 110 are to be applied to patch target machine 111. From a memory area such as a patch state\history store 112, sequencing engine 104 also receives sequencing data regarding patches already applied to patch target machine 111. By receiving the sequencing data of the new patches 110 and the sequencing data of the patches already applied to patch target machine 111, sequencing engine 104 may identify those patches that are applicable to a software product that is installed or is to be installed on patch target machine 111. For example, sequencing engine 104 may determine that one or more of patches 110 are obsolete or superseded by an existing patch or have already been applied to the software product. Sequencing engine 104 may also return a final list of applicable patches.

Sequencing engine 104 further computes a logical order of an applicable patch relative to other applicable patches to be or already applied to patch target machine 111. For example, sequencing engine 104 may compute the logical order of application by determining a portion of the software product of which the applicable patches are members and then arranging the patches according to their relative orderings within the portion. Sequencing engine 104 then provides the computed patch sequence (i.e., the logical order of patches) of applicable patches to the target state evaluator 106 of installation engine 102.

Target state evaluator 106 is configured to receive the computed patch sequence from sequencing engine 104 and to receive target data from target definition 114. The target definition 114 specifies in the target data a desired property and state of a product installed or to be installed on patch target machine 111. Accordingly, target state evaluator 106 may determine a desired product state based on the received target data. Furthermore, target state evaluator 106 then provides this desired product state and the computed patch sequence to the patch application engine 108 of installation engine 102.

In addition to the received desired product state and the computed patch sequence, patch application engine 108 also receives a current state of patch target machine 111. Therefore, patch application engine 108 may determine how to apply the applicable patches to patch target machine 111 as a function of the desired product state, the current machine state, and the computed patch sequence. For example, if according to the computed patch sequence, the current state of patch target machine 111 is the same as the desired product state, patch application engine 108 may decide not to apply a patch to patch target machine 111. Patch application engine 108 may also apply the applicable patches to patch target machine 111 according to the computed patch sequence such that patch target machine 111 achieves the desired product state.

According to an embodiment of the invention, patch application engine 108 is configured to apply multiple patches to one or more software products in a single transaction. For example, patch application engine 108 may apply multiple patches to different software products installed for a particular user on patch target machine 111 or installed for any user on patch target machine 111. Patch application engine 108 is configured to examine applicable patches, obtain a combined list of target software products, and then initiate a single installation transaction per product. In a single installation transaction, patch application engine 108 applies multiple patches that target a particular software product at the same time. If a particular installation transaction fails (e.g., when patch application engine 108 fails to apply one or more of the applicable patches to the target product in this transaction or if an initiated or suppressed reboot occurs), patch application engine 108 may rollback the target product to its original state. However, failure in a transaction does not affect other installation transactions. Moreover, if a transaction fails, patch application engine 108 may initiate another transaction to complete the patching. Since sequencing engine 104 has identified applicable patches, patch application engine 108 may skip those target products that have already been patched and concentrate on those target products that have not yet been patched. In addition, a user may initiate multiple installation transactions for multiple patches via a single application programming interface (API) call or multiple API calls to installation engine 102. Alternatively, the user may initiate the transactions via a command line.

An embodiment of the invention presents to the user the results of patch installation after applying multiple patches to one or more target products. Specifically, installation engine 102 may provide the list and/or count of products that have been updated in a given transaction. For example, at the end of each installation transaction, installation engine 102 may log the updated products in a history file for presentation to the user. Alternatively, the user may retrieve the result of a transaction via an API call to enumerate the updated products.

After patch application engine 108 determines an action for patch target machine 111 and, for example, applies the set of new patches 110 to update patch target machine 111, it determines a new current state of patch target machine 111 and stores this new current state in the patch state\history store 112 as a new patch state\history of patch target machine 111. Patch state\history store 112 may then supply this new patch state\history to sequencing engine 104 during the next round of patch updates.

Figure 2:
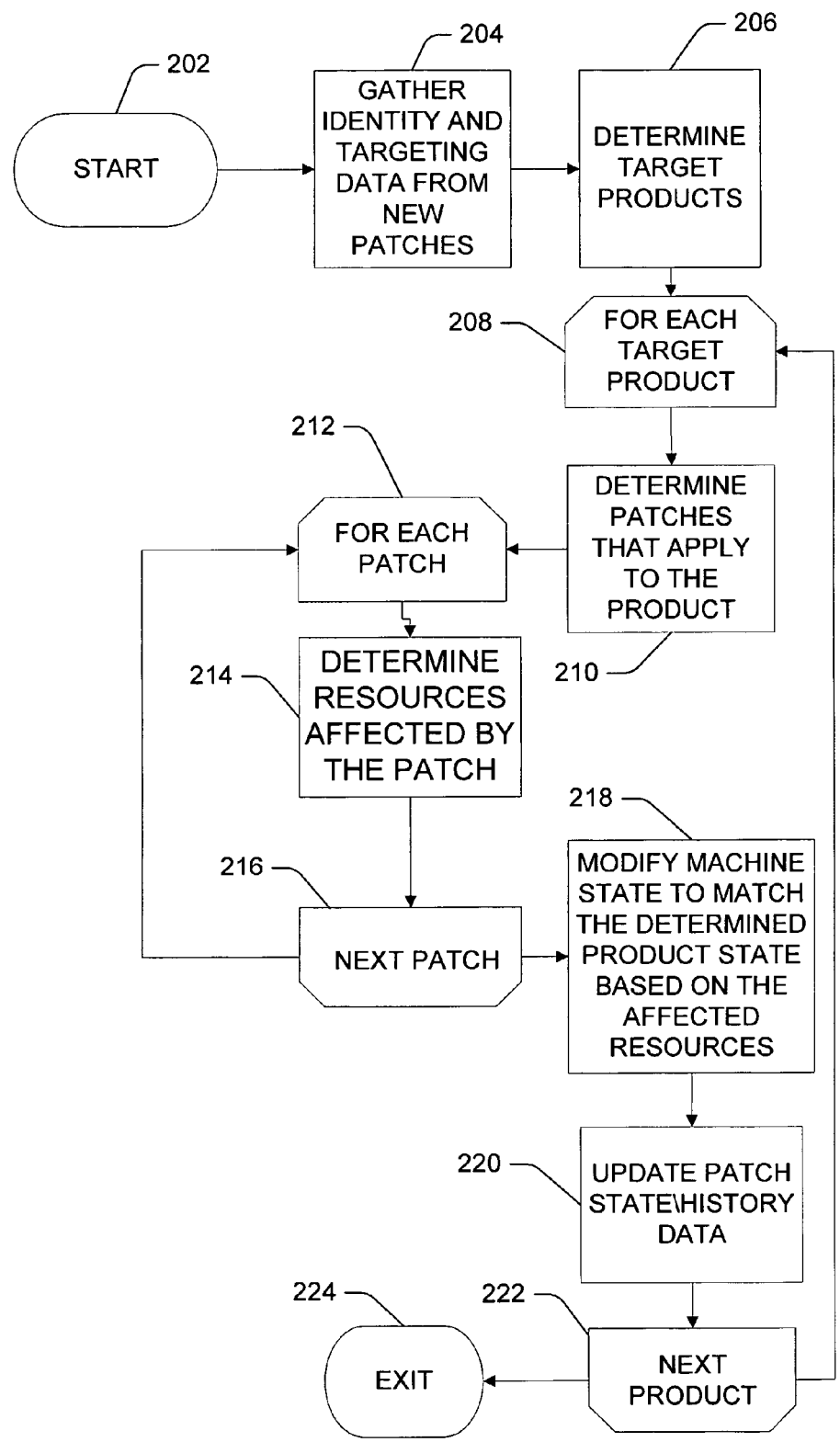
FIG. 2 is an exemplary flow diagram illustrating process flow according to one embodiment of the invention for applying multiple patches to one or more software products in a single transaction.

FIG. 2 illustrates an exemplary process flow that installation engine 102 utilizes to apply multiple patches to one or more software products in a single installation transaction according to one embodiment of the invention. At 202, the process starts. At 204, identity data and targeting data from new patches are gathered. At 206, a target product for each of the new patches is determined, for example, by examining the patch file of each new patch. A particular patch may target more than one software product, and a software product may be targeted by more than one patch. The target product may be determined based on a specified user or machine. Thus, a new patch may target one or more target products installed for a particular user. Alternatively, the new patch may target one or more target products installed for different users on patch target machine 111.

For each target product at 208, patches that apply to the target product are determined at 210. Thus, if a patch targets multiple target products, installation engine 102 patches each target product in an individual transaction such that multiple transactions (as one per target product) occur sequentially. More specifically, sequencing engine 102 may identify new patches and existing patches that are applicable to the target product and determine a logical order for applying the applicable patches to the target product in a single transaction. Sequencing engine 102 determines the logical order of application irrespective of the chronological order that the applicable patches are delivered to the machine.

For each applicable patch of the target product at 212, resources that are affected by the applicable patch are determined at 214. At 216, it is determined if there is another applicable patch for this target product. If there is another applicable patch, the process returns to 212. If there is not another applicable patch, the machine state is modified to match a desired state of the target product based on the affected resources at 218. More specifically, patch application engine 108 uses the list of resources compiled and aggregated across the patches at 214 to choose the desired state for each resource at a resource level based on the consolidated list of patches that affect the resource. Patch application engine 108 then modify the state of each resource to achieve the desired state of the resource. For example, if resource A is affected by patches A, B, and C, patch application engine 108 may use the logical ordering of the patches to determine whether the changes made by patch A, B, or C (or some combination thereof) are going to take effect on patch target machine 111. This logic is performed at a per-resource level instead of a per-patch level to allow the optimal decision to be made for each resource and to handle the case where a patch does not affect the source. In an alternative embodiment of the invention, resources are tracked in groups and the decision is made for a group of resources (i.e., the per-resource decision is a degenerate case where each group includes one resource).

At 220, new patch state\history data resulting from applying the one or more applicable patches to the target product is stored, for example, in patch state\history store 112. This new patch state\history data may later be fetched for future patch installations. At this time, the installation transaction for this particular target product is completed and a product level result and/or a notification are created for the product. And at 222, a product level result or an inventory call is examined to determine if there is an additional target product to be updated. If there is an additional target product, the process returns to 208. If there is not an additional target product, the process exits at 224.

In an embodiment of the invention, even if an installation transaction for a particular target product fails, installation engine 102 may continue to apply applicable patches to the next target product. That is, installation engine 102 may skip target products that have been patched or have been attempted to be patched and proceed to update target products that are yet to be patched. Accordingly, installation engine 102 may at least attempt to update the determined target products. Furthermore, if a reboot is desired to effect the changes from a particular transaction, in one embodiment of the invention, installation engine 102 may halt the processing of further target products. In an alternative embodiment of the invention, installation engine 102 may continue patching the remaining target products. In this alternative embodiment of the invention, the knowledge for the cause of the reboot is used to patch the remaining target products correctly. After installation engine 102 completes the patching operation, it may either initiate a reboot or prompt the user for a reboot.

At the end of each installation transaction, installation engine 102 may log two types of entries in a history file. If installation engine 102 successfully completes the installation transaction, it returns a success entry that includes an identifier of the target product (e.g., a product code) and the GUIDs of the patches applied to this target product in this transaction. If installation engine 102 fails to complete the installation transaction, it returns a failure entry that includes an identifier of the target product (e.g., a product code), the GUIDs of the applicable patches attempted for this target product in this transaction, and optionally the patch that caused the failure. For either type of entries, installation engine 102 may further provide additional details regarding the installation transaction.

Embodiments of the invention also allow a non-privileged user to apply a patch to a software product. In particular, the state of a particular patch may be elevated to allow a non-privileged user to apply the patch to a software product that is installed in a location where the non-privileged user normally does not have the rights to modify. An exemplary policy (referred to herein as the DisablePatch policy) also allows an administrator to prohibit any user (including administrators) from applying a patch to a software product installed on a given machine. In addition, a patch may be elevated if an administrator pre-approves the patch for installation or if the patch is digitally signed by a certificate that matches one of the certificates provided by the author of the targeted software product as trusted certificates. In an embodiment of the invention, an exemplary PatchCertificate table provides the trusted certificates.

In an exemplary way to efficiently validate trust data, a patch that is elevated using a certificate is marked as such in the target product's patch configuration data to allow subsequent accesses of the patch from the original source location (e.g., when the cached patch is missing) to reevaluate the patch's certificate and signature. Thus, patches applied to a software product may be distinguished from each other based on if a patch is applied by an administrator or by a non-privileged user (e.g., via elevated patching using a certificate). If a cached patch is not missing, then the cached patch is not reevaluated when being reapplied to a software product because the cached patch is already registered with the software product and is stored in a secure location. However, if a cached patch is missing, then it is reevaluated for elevation when being reapplied to a software product to preserve certificate data integrity and authentication. A patch that is not elevated using a certificate may be reapplied to a software product without being reevaluated even if it is digitally signed.

TABLE 1 provides exemplary installation policies and their precedence according to one embodiment of the invention.

TABLE 1

Exemplary Installation Policies

| Policy | Precedence | Applicability |
| --- | --- | --- |
| DisablePatch | 1 | Both privileged and non-privileged users |
| AllowLockDownPatch | 2 | Non-privileged users |
| PatchRegisteredList | 3 | Non-privileged users |
| DisableElevatedPatching | 4 | Non-privileged users |

The DisablePatch policy takes precedence over other installation policies. If the DisablePatch policy is set, application of new patches is prohibited for target products and users (including privileged users). However, the DisablePatch policy does not affect previously applied patches. If the DisablePatch policy is not set and the user is privileged (e.g., an administrator), then any patch may be applied, regardless of the other policies.

If the DisablePatch policy is not set, a non-privileged user may apply patches to products that are not installed in locations that the non-privileged user does not have rights to modify. For products that are installed in locations that the non-privileged user does not have rights to modify, if the AllowLockDownPatch policy is set, the non-privileged user may apply the patch without elevating the patch. If the AllowLockDownPatch policy is not set, then the non-privileged user may apply the patch if the patch is on the PatchRegisteredList. The non-privileged user may also apply the patch if the DisableElevatedPatching policy is not set and the patch has been elevated for installation.

To elevate a patch for a non-privileged user to install the patch, the patch either has been pre-approved by a privileged user for elevation or includes a trusted digital certificate. For example, an installation package may include a certificate that is used to sign subsequent patches. Before a patch is applied, the certificate in the patch's digital signature is extracted and compared with the certificates stored in the installation package (or added by previous patches). A non-privileged user may apply a patch after the patch's digital certificate has been validated.

The PatchCertificate table in the installation package includes a reference to the certificate to be used to digitally sign a patch. TABLE 2 provides an exemplary format of the PatchCertificate table according to one embodiment of the invention.

TABLE 2

Exemplary Format of the PatchCertificate Table

| Column Name | Nullable? | Key? | Type | Description |
| --- | --- | --- | --- | --- |
| PatchCertificate | No | Yes | Identifier | Unique identifier for the row |
| DigitalCertificate_ | No | No | Identifier | Foreign key to a patch certificate stored in a DigitalCertificate table |

The PatchCertificate column serves as the unique identifier for the row. The DigitalCertificate_column references a row in an exemplary table (referred to herein as the DigitalCertificate table) that includes the binary form of the certificate that will be used to digitally sign a patch. It is possible for multiple certificates to exist in the table. For example, previous patches may add entries to the PatchCertificate table for evaluation of future patches. Furthermore, a patch may also remove a row from the PatchCertificate table or modify an entry in the PatchCertificate table to affect subsequent patches.

The DigitalCertificate table allows for digital signing and verification of external cabinet files during installation. This table is also used to store the signing certificates for signed patches. TABLE 3 provides an exemplary format of the DigitalCertificate table according to one embodiment of the invention.

TABLE 3

Exemplary Format of the DigitalCertificate Table

| Column Name | Nullable? | Key? | Type | Description |
| --- | --- | --- | --- | --- |
| DigitalCertificate | No | Yes | Identifier | Unique identifier for the row |
| CertData | No | No | Binary | Actual binary data containing the signer certificate for the patch |

In an exemplary embodiment of the invention, elevated patching using a digital certificate is not permitted for a patch installation originating from a non-removable medium such as a communications network (e.g., the Internet).

Figure 3:
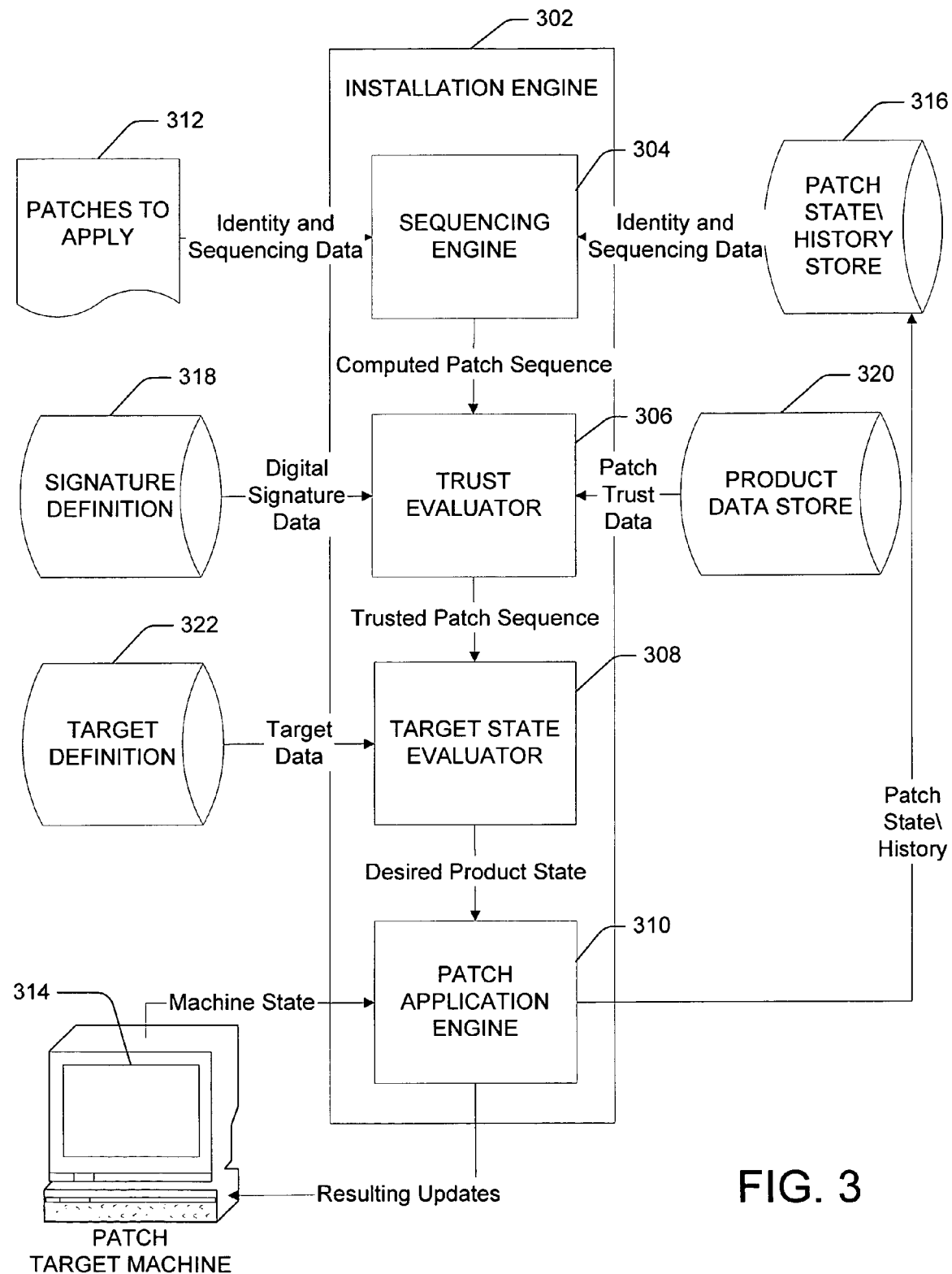
FIG. 3 is a block diagram illustrating another exemplary environment in which embodiments of the present invention may be utilized.

FIG. 3 illustrates an exemplary environment in which embodiments of the invention may be utilized to allow a non-privileged user to apply a patch to a software product. As shown in FIG. 3, a processor such as an installation engine 302 includes a sequencing engine 304, a trust evaluator 306, a target state evaluator 308, and a patch application engine 310. The installation engine 302 has greater rights than the non-privileged user does. Therefore, the privileged installation engine 302 may perform the installation actions on behalf of the non-privileged user after validating that the installation request from the non-privileged user is trusted.

In FIG. 3, installation engine 302 is attempting to apply a set of new patches 312 to one or more software products installed on a patch target machine 314. The set of new patches 312 represents one or more updates to one or more software products. As illustrated, the sequencing engine 304 of installation engine 302 receives the set of new patches 312. Included in this set of new patches 312 is sequencing data that describes the order in which patches 312 are to be applied to patch target machine 314. From a memory area such as a patch state\history store 316, sequencing engine 304 also receives sequencing data regarding patches already applied to patch target machine 314. By receiving the sequencing data of the new patches 312 and the sequencing data of the patches already applied to patch target machine 314, sequencing engine 304 may identify those patches that are applicable to a software product that is installed or is to be installed on patch target machine 314. For example, sequencing engine 304 may determine that one or more of patches 312 are obsoleted or superseded by an existing patch or have already been applied to the software product.

Sequencing engine 304 further computes a logical order of an applicable patch relative to other applicable patches to be or already applied to patch target machine 314. Sequencing engine 304 then provides the computed patch sequence (i.e., the logical order of patches) of applicable patches to the trust evaluator 306 of installation engine 302.

Trust evaluator 306 receives digital signature data (e.g., digital signature signed by a certificate) of the applicable patches from signature definition 318. Trust evaluator 306 also receives patch trust data (e.g., approved certificates or approved trust identities) from a product data store 320. A privileged user such as an administrator stores the patch trust data in the product data store 320 to indicate a list of patches that may be trusted. Trust evaluator 306 first compares the identity of the patch with the list of approved identities from product data store 320. If the patch is found in the approval list, then trust evaluator 306 may add the trusted patch to a trusted patch sequence that represents a logical order of application for trusted patches. If the patch is not in the approval list, then trust evaluator 306 compares the received digital signature data of each applicable patch against the received patch trust data to validate the digital signature data. Trust evaluator 306 first validates that the patch contents match the digital signature (e.g. hashes match). If trust evaluator 306 validates that the patch contents match the digital signature, it extracts the certificate of the patch's digital signature to compare the received digital data against the received patch trust data. Trust evaluator 306 then copies the extracted certificate to a byte buffer. Trust evaluator 306 then compares the byte buffer to the certificate byte data referenced by the PatchCertificate table. If trust evaluator 306 successfully validates the patch's certificate, then the patch is trusted. Trust evaluator 306 may then add the trusted patch to a trusted patch sequence that represents a logical order of application for trusted patches. Trust evaluator 306 then provides the trusted patch sequence to the target state evaluator 308 of installation engine 302. If trust evaluator 306 determines that some patches are not trusted, it may fail the transaction and report an error that indicates the problem.

Target state evaluator 308 is configured to receive the trusted patch sequence from trust evaluator 306 and to receive target data from target definition 322. The target definition 322 specifies in the target data a desired property and state of a product installed or to be installed on patch target machine 314. Accordingly, target state evaluator 308 may determine a desired product state based on the received target data. Furthermore, target state evaluator 308 then provides this desired product state and the trusted patch sequence to the patch application engine 310 of installation engine 302.

In addition to the received desired product state and the trusted patch sequence, patch application engine 310 also receives a current state of patch target machine 314. Therefore, patch application engine 310 may determine how to apply the applicable patches to patch target machine 314 as a function of the desired product state, the current machine state, and the trusted patch sequence. For example, if according to the trusted patch sequence, the current state of patch target machine 314 is the same as the desired product state, patch application engine 310 may decide not to apply a patch to patch target machine 314. Patch application engine 310 may also apply the applicable patches to patch target machine 314 according to the trusted patch sequence such that patch target machine 314 achieves the desired product state.

After patch application engine 310 determines an action for patch target machine 314 and, for example, applies the set of new patches 312 to update patch target machine 314, it determines a new current state of patch target machine 314 and stores this new current state in the patch state\history store 316 as a new patch state\history of patch target machine 314. Patch state\history store 316 may then supply this new patch state\history to sequencing engine 304 during the next round of patch updates.

An embodiment of the invention allows a non-privileged user (e.g., a non-administrator) to install a specified patch even in cases where installation engine 302 desires the user to be privileged to install the patch. The embodiment of the invention allows the non-privileged user to install the patch without authoring changes in the patch. Thus, if a patch's path or source specified by the non-privileged user matches one of the paths or sources registered for this patch in the same context, installation engine 302 may allow the non-privileged user to install the patch because the specified path or source is trusted. Under a managed context (e.g., when user privilege is desired for patch installation but the patch installation desires privileges not available to the user), a privileged user (e.g., an administrator) may register a path or source for a patch if the patch targets an existing software product. TABLE 4 provides an exemplary trust model according to one embodiment of the invention.

TABLE 4

Exemplary Trust Model

| Scenario | Result |
| --- | --- |
| System-wide policy is set. | Patches are trusted. |
| User has administrative privileges. | Patches are trusted. |
| Non-administrative user patches | Patches are trusted. |

TABLE 4-continued

Exemplary Trust Model

| Scenario | Result |
| --- | --- |
| products that are not installed in locations that the non-administrative user does not have rights to modify. | |
| New Patches: | |
| Non-administrative user patches products that are installed in locations that the non-administrative user does not have rights to modify. | Registered patches or patches that have valid certificates are trusted. |
| Cached Patches: | |
| Non-administrative user patches products that are installed in locations that the non-administrative user does not have rights to modify. | Cached patches are trusted. |
| Missing Cached Patches: | |
| Non-administrative user patches products that are installed in locations that the non-administrative user does not have rights to modify. | Patches obtained through registered paths or sources are trusted based on current policies. |

After a period of time, a digital certificate may expire. In an embodiment of the invention, trust evaluator 306 permits an expired certificate if it matches the authoring of the corresponding installation package. However, trust evaluator 306 may not allow a newly created patch signed with an expired certificate. In addition, when a certificate's private key is compromised, the certificate is placed on a revocation list. Trust evaluator 306 may not trust a patch signed with a revoked certificate. Accordingly, installation engine 302 may not elevate a patch signed with a revoked certificate unless a privileged user pre-approves the patch. If the cached copy of an existing patch is missing, the patch is no longer trusted (e.g., the certificate of the existing patch is revoked).

If a patch targets multiple products and some of the target products allow elevated patching while some other target products disallow elevated patching, then installation engine 302 may allow a non-privileged user to elevate the patch for applying to the target products that allow elevated patching.

Figure 4:
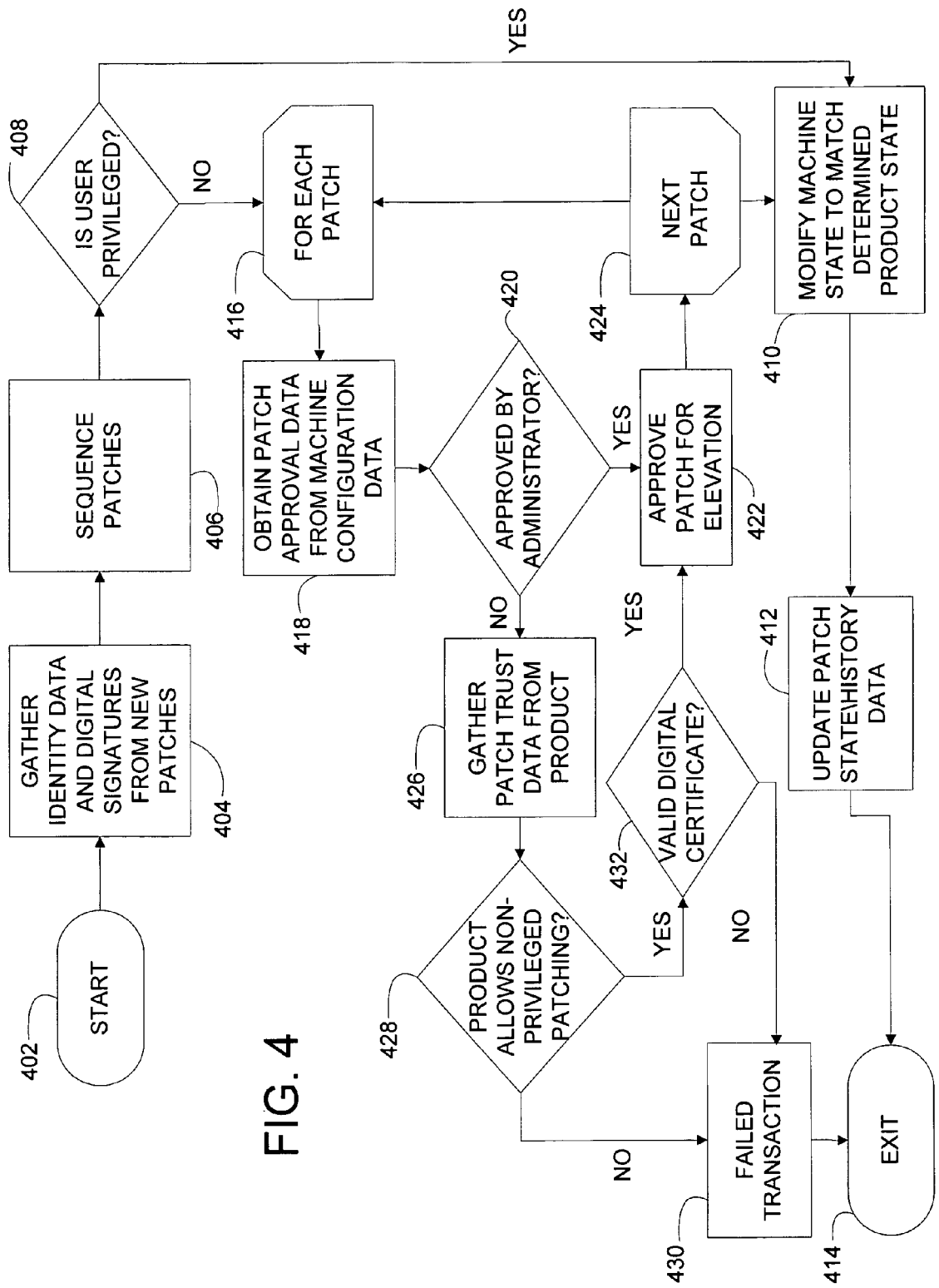
FIG. 4 is an exemplary flow diagram illustrating process flow according to one embodiment of the invention for allowing a non-privileged user to apply a patch to a software product.

FIG. 4 illustrates an exemplary process flow for a non-privileged user to apply a patch to a software product according to one embodiment of the invention. At 402, the process starts. At 404, identity data and digital signatures are gathered from new patches. At 406, the new patches and existing patches are sequenced to determine a logical order for applying the patches. At 408, it is determined if the user applying the patches is privileged. If it is determined that the user is privileged, the machine state is modified to match a determined product state at 410. At 412, the patch state\history data is updated in, for example, patch state\history store 316. At 414, the process exits.

If it is determined that the user is not privileged at 408, then for each patch at 416, patch approval data is obtained from machine configuration data at 418. Then at 420, it is determined if application of a particular patch has been approved by a privileged user such as an administrator. If the patch has been approved by the privileged user, the patch is approved for elevation to allow the non-privileged user to apply to a software product at 422. At 424, it is determined if there is another patch for consideration. If there is another patch for consideration, the process returns to 416. If there is not another patch for consideration, the machine state is modified to match a determined product state at 410. At 412, the patch state\history data is updated in, for example, patch state\history store 316. At 414, the process exits.

Returning to 420, if it is determined that the patch has not been approved by the privileged user, patch trust data is gathered from the software product targeted by the patch at 426. At 428, it is determined if the software product allows a non-privileged user to update the software product. If it is determined that the software product does not allow a non-privileged user to update the software product, the transaction fails at 430. The process then exits at 414. If it is determined that the software product allows a non-privileged user to update the software product, it is determined at 432 if the patch is digitally signed by certificate that is trusted by the target software product. If the patch does not include a trusted certificate, the transaction fails at 430. The process then exits at 414. If the patch includes a trusted certificate, the patch is approved for elevation to allow the non-privileged user to apply to a software product at 422. At 424, it is determined if there is another patch for consideration. If there is another patch for consideration, the process returns to 416. If there is not another patch for consideration, the machine state is modified to match a determined product state at 410. At 412, the patch state\history data is updated in, for example, patch state\history store 316. At 414, the process exits.

An embodiment of the invention also provides a patch certificate tool to allow customization of elevated patching capabilities. The patch certificate tool has the ability to display the current enabling certificates as identified by the PatchCertificate table. The patch certificate tool also has the ability to create the PatchCertificate table, to add a certificate to the PatchCertificate table, to remove a certificate from the PatchCertificate table, and to edit a certificate in the PatchCertificate table.

An administrator may at times decide to enable or disable elevated patching, whether globally on a machine or for a particular software product. If the administrator disables elevated patching, any previously patches installed by a non-privileged user still apply to the target software products. But any attempt by a non-privileged user to apply a new patch will fail with an error indicating that the administrator has disabled elevated patching. On the other hand, if the administrator enables elevated patching, previous attempts by a non-privileged user to install a patch still have no effects on the target products. However, after the administrator enables elevated patching, the non-privileged user may elevate the patch for installation if the patch has been pre-approved by an administrator or is digitally signed by certificate that matches one of the certificates in the PatchCertificate table.

Figure 5:
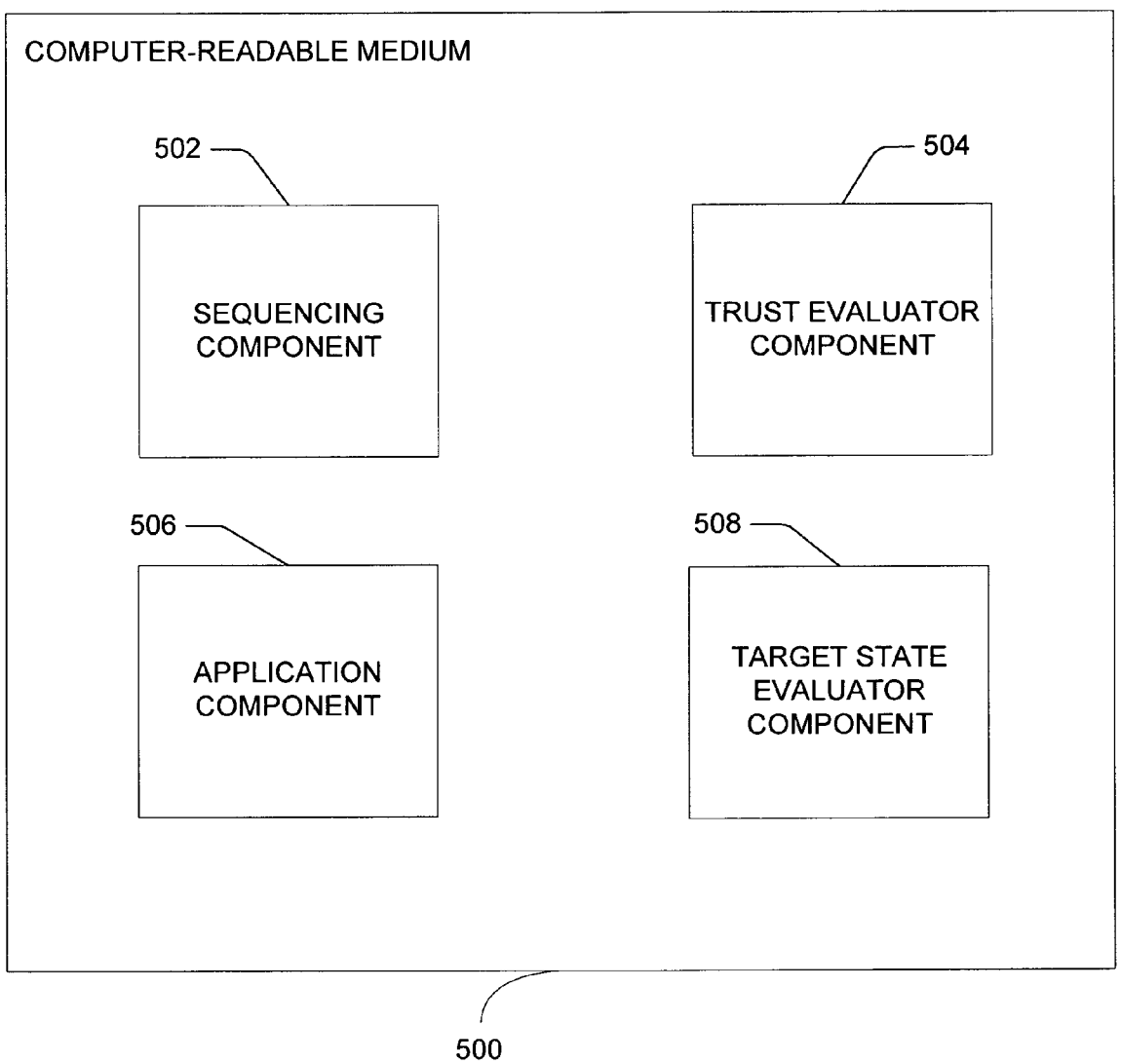
FIG. 5 is a block diagram illustrating an exemplary computer-readable medium according to one embodiment of the invention.

FIG. 5 is a block diagram illustrating an exemplary computer-readable medium 500 according to one embodiment of the invention. As shown, the computer-readable medium 500 includes a sequencing component 502, a trust evaluator component 504, an application component 506, and a target state evaluator component 508. However, it is contemplated that computer-readable medium 500 may be any quantity of computer readable media and may comprise various combinations of components and functionalities associated with each component.

In an embodiment of the invention, computer-readable medium 500 allows application of multiple patches to one or more software products. Specifically, the sequencing component 502 receives a plurality of patches from a user and determines one or more software products targeted by the received plurality of patches. The application component 506 then identifies one or more of the received plurality of patches that are application to a particular product of the determined one or more software products and then applies the identified one or more patches to the particular product as a function of a state of the particular product in a single installation transaction. For example, application component 506 may apply the identified one or more patches to the product by modifying the state of the product to match a desired state of the product. Specifically, the target state evaluator component 508 determines a list of resources of the product affected by the identified one or more patches and identifies a desired state for each resource in the list of resources based on those of the identified patches that affect the resource. Application component 506 then modifies each resource in the list of resources to achieve the desired state for each resource in the list of resources. In response to applying the identified one or more patches to the product, application component 506 may present to the user the product that has been updated and a list of patches that have been applied to the product. Application component 506 may further update the other determined software products in other installation transactions.

Application component 506 may apply the identified one or more patches to the product during an initial installation of the product. Application component 506 is also configured to rollback the particular product to its previous state if the installation transaction fails. Furthermore, application component 506 is configured to apply the identified one or more patches to the software product at substantially the same time. Sequencing component 502 is configured to determine a logical order of application for the identified one or more patches, and application component 506 is configured to apply the identified one or more patches to the particular product in accordance with the determined logical order of application. Sequencing component 502 may determine the logical order of application by determining a portion of the product of which the identified one or more patches are members and arranging the identified one or more patches according to their relative orderings within the determined portion of the product.

In another embodiment of the invention, computer-readable medium 500 allows a non-privileged user to apply a patch to a software product. In particular, sequencing component 502 is configured to receive a set of patches from a non-privileged user and a set of one or more patches currently applied to a target software product. Sequencing component 502 is configured to generate a logical order of patch application from the received data. The trust evaluator component 504 is configured to determine if the received patch is capable of being applied to a target software product by the non-privileged user. Specifically, trust evaluator component 504 determines if a privileged user has approved the received patch for applying to the target software product or if the received patch is trusted for applying to the target software product. Trust evaluator component 504 determines if the privileged user has approved the received patch for applying to the target software product by determining if a source of the received patch provided by the non-privileged user matches a registered source for the received patch. Trust evaluator component 504 determines if the received patch is trusted for applying to the target software product by determining if the received patch is digitally signed by a certificate that matches a certificate registered with the target software product. In particular, trust evaluator component 504 extracts a certificate from the received patch's digital signature. Trust evaluator component 504 then copies the extracted certificate to a byte buffer. In response, trust evaluator component 504 compares the byte buffer with binary data representing a certificate that is registered with the target software product. However, the trust evaluator component 504 may determine that the received patch is not trusted for applying to the target software product if the certificate of the received patch has been revoked.

In response to determining that the received patch is capable of being applied to the target software product by the non-privileged user, application component 506 applies the received patch to the target software product.

Figure 6:
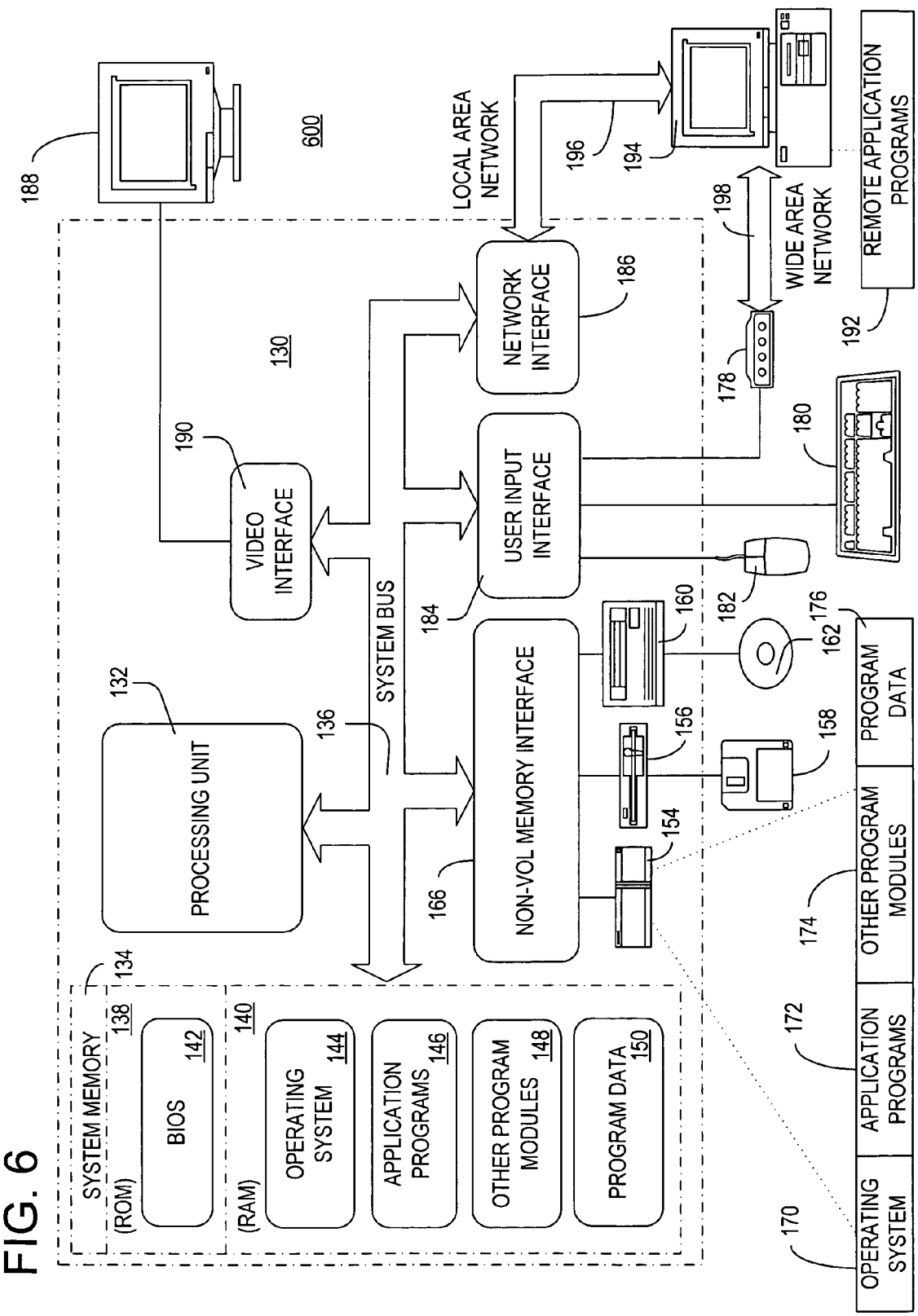
FIG. 6 is a block diagram illustrating an exemplary embodiment of a suitable computing system environment in which one embodiment of the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

In operation, computer 130 executes computer-executable instructions such as those described herein to allow a non-privileged user to apply a patch to a software product. Computer-executable instructions are configured to receive a patch from a non-privileged user. Computer-executable instructions are also configured to determine if the received patch is capable of being applied to a target software product by the non-privileged user. Computer-executable instructions are further configured to apply the received patch to the target software product if it is determined that the received patch is capable of being applied to the target software product by the non-privileged user.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A method of allowing a non-privileged user to apply a patch to a target software product, said non-privileged user having an account privilege with insufficient rights to apply the patch, the method comprising:
   receiving the patch from the non-privileged user, said patch having a state indicating privilege information included in patch trust data or digital signature data associated therewith, said state indicating at least one of the following information so as to distinguish from each other based on whether the patch is permitted to be applied by an administrator having an account privilege with sufficient rights to apply the patch or by the non-privileged user: the patch is pre-approved by the administrator for elevation to enable the non-privileged user to apply the patch and the patch is elevated by a trusted digital certificate such that the non-privileged user can apply the patch using a matching certificate registered with the target software product,
   determining if the received patch has been pre-approved by the administrator to enable the non-privileged user to apply the patch to the target software product based on the patch state or the patch has been elevated by the trusted digital certificate such that the non-privileged user can apply the patch using the matching certificate, and
   applying, by the non-privileged user having the account privilege with insufficient rights to apply the patch, the received patch to the target software product if it is determined that the received patch has been elevated to enable the non-privileged user to apply the patch to the target software product or the non-privileged user has the matching certificate, wherein the state of the patch is elevated to allow the non-privileged user to apply the patch to the software product.

2. The method of claim 1 wherein determining if the received patch has been pre-approved by the administrator for applying to the target software product comprises determining if a source of the received patch provided by the non-privileged user matches a registered source for the received patch.

3. The method of claim 1 wherein determining if the received patch has been elevated by the trusted digital certificate comprises:
   extracting the certificate from the received patch's digital signature,
   copying the extracted certificate to a byte buffer, and
   comparing the byte buffer with binary data representing a certificate that is registered with the target software product.

4. The method of claim 3 further comprising determining that the received patch is not trusted for applying to the target software product if the certificate of the received patch has been revoked or if the received patch's digital signature is not valid against the certificate registered with the target software product.

5. A system for allowing a non-privileged user to apply a patch to a target software product, said non-privileged user having an account privilege with insufficient rights to apply the patch, the system comprising:
   a processor configured to receive the patch from the non-privileged user, said patch having a state indicating privilege information included in patch trust data or digital signature data associated therewith, said state indicating at least one of the following information so as to distinguish from each other based on whether the patch is permitted to be applied by an administrator having an account privilege with sufficient rights to apply the patch or by the non-privileged user: the patch is pre-approved by the administrator for elevation to enable the non-privileged user to apply the patch and the patch is elevated by a trusted digital certificate such that the non-privileged user can apply the patch using a matching certificate registered with the target software product, the processor also being configured to determine if the received patch is pre-approved by the administrator to enable the non-privileged user to apply the patch to the target software product based on the patch state, and
   wherein the processor is configured to apply, by the non-privileged user having the account privilege with insufficient rights to apply the patch, the received patch to the target software product if it is determined that the received patch has been pre-approved by the administrator to enable the non-privileged user to apply the patch to the target software product or the patch has been elevated by the trusted digital certificate such that the non-privileged user can apply the patch using the matching certificate, wherein the state of the patch is elevated to allow the non-privileged user to apply the patch to the software product.

6. The system of claim 5 wherein the processor is configured to determine if the received patch has been pre-approved by the administrator for applying to the target software product if a source of the received patch provided by the non-privileged user matches a registered source for the received patch.

7. The system of claim 5 wherein the processor is configured to determine if the received patch has been elevated by the trusted digital certificate by:

extracting the certificate from the received patch's digital signature, copying the extracted certificate to a byte buffer, and comparing the byte buffer with binary data representing a certificate that is registered with the target software product.

8. The system of claim 7 wherein the processor is configured to determine that the received patch is not trusted for applying to the target software product if the certificate of the received patch has been revoked or if the received patch's digital signature is not valid against the certificate registered with the target software product.

9. One or more computer storage media having computer-executable components for allowing a non-privileged user to apply a patch to a target software product, said non-privileged user having an account privilege with insufficient rights to apply the patch, the computer storage media comprising:

a sequencing component for receiving the patch from the non-privileged user, said patch having a state indicating privilege information included in patch trust data or digital signature data associated therewith, said state indicating at least one of the following information so as to distinguish from each other based on whether the patch is permitted to be applied by an administrator having an account privilege with sufficient rights to apply the patch or by the non-privileged user: the patch is pre-approved by the administrator for elevation to enable the non-privileged user to apply the patch and the patch is elevated by a trusted digital certificate such that the non-privileged user can apply the patch using a matching certificate registered with the target software product, a trust evaluator component for determining if the received patch has been pre-approved by the administrator to enable the non-privileged user to apply the patch to the target software product based on the patch state or the patch has been elevated by the trusted digital certificate such that the non-privileged user can apply the patch using the matching certificate, and an application component for applying, by the non-privileged user having the account privilege with insufficient rights to apply the patch, the received patch to the target software product if it is determined that the received patch has been pre-approved to enable the non-privileged user for applying to the target software product or the non-privileged user has the matching certificate, wherein the state of the patch is elevated to allow the non-privileged user to apply the patch to the software product.

10. The computer storage media of claim 9 wherein the trust evaluator component is configured to determine if the received patch has been pre-approved by the administrator for applying to the target software product by determining if a source of the received patch provided by the non-privileged user matches a registered source for the received patch.

11. The computer storage media of claim 9 wherein the trust evaluator component is configured to determine if the received patch is has been elevated by the trusted digital certificate by:

extracting the certificate from the received patch's digital signature, copying the extracted certificate to a byte buffer, and comparing the byte buffer with binary data representing a certificate that is registered with the target software product.

12. The computer storage media of claim 9 wherein the trust evaluator component is configured to determine that the received patch is not trusted for applying to the target software product if the certificate of the received patch has been revoked or if the received' patch's digital signature is not valid against the certificate registered with the target software product.

* * * * *